United States Patent [19]
Jones et al.

[11] Patent Number: 5,213,017
[45] Date of Patent: May 25, 1993

[54] NEUTRALLY MOUNTED SAME VIBRATION FREQUENCY IMPACT TOOL

[75] Inventors: Jack D. Jones, Lima; James D. Knebel, Delphos, both of Ohio

[73] Assignee: Aircraft Dynamics Corporation, Elida, Ohio

[21] Appl. No.: 777,904

[22] Filed: Oct. 17, 1991

Related U.S. Application Data

[63] Continuation-in-part of Ser. No. 339,403, Apr. 17, 1989, Pat. No. 5,070,750, which is a continuation-in-part of Ser. No. 187,630, Apr. 28, 1988, Pat. No. 5,083,358.

[51] Int. Cl.$^5$ .............................................. B25B 21/00
[52] U.S. Cl. ........................................... 81/464; 29/275
[58] Field of Search .............. 29/240, 270, 275, 525.2, 29/596, 597, 598; 81/58.1, 436, 437, 438, 439, 440, 441, 464, 465, 466; 173/132; 310/15, 166, 229, 220; 324/546

[56] References Cited

U.S. PATENT DOCUMENTS

| | | | |
|---|---|---|---|
| 3,861,250 | 1/1975 | Zugai | 81/464 |
| 4,380,942 | 4/1983 | Fenton | 81/436 |
| 4,468,826 | 9/1984 | Moores, Jr. | 81/464 X |
| 4,503,737 | 3/1985 | DiGiovanni | 81/441 X |
| 4,507,565 | 3/1985 | Hamano | 310/229 X |
| 4,561,331 | 12/1985 | Pratt, Sr. | 81/464 |
| 4,563,922 | 1/1986 | Wheeler | 81/441 |
| 4,619,162 | 10/1986 | Van Laere | 81/464 |
| 4,658,213 | 4/1987 | Finley | 324/546 X |
| 4,716,793 | 1/1988 | Tauber | 81/441 X |

FOREIGN PATENT DOCUMENTS

| | | | |
|---|---|---|---|
| 3337206 | 4/1984 | Fed. Rep. of Germany | 81/464 |
| 4727320 | 11/1969 | Japan | 81/464 |
| 662318 | 12/1951 | United Kingdom | 81/436 |

Primary Examiner—Mark Rosenbaum
Assistant Examiner—Peter Dungba Vo
Attorney, Agent, or Firm—Sidney W. Millard

[57] ABSTRACT

A battery powers the motor of an electrically powered impact gun. The body of the gun vibrates at some frequency and an aluminum brush holder therein is configured to vibrate at about the same frequency to minimize chatter and arcing of the brushes on the commutator bars.

12 Claims, 4 Drawing Sheets

NEUTRALLY MOUNTED SAME VIBRATION FREQUENCY IMPACT TOOL

REFERENCE TO OTHER CASE

This application is a continuation-in-part of application Ser. No. 339,403, filed Apr. 17, 1989, now U.S. Pat. No. 5,070,750 which is a continuation-in-part of application Ser. No. 187,630, filed Apr. 28, 1988, now U.S. Pat No. 5,083,358.

FIELD OF THE INVENTION

This invention relates to an apparatus for a battery powered rotary impact tool.

BACKGROUND OF THE INVENTION

Impact tools fitted with appropriate sockets to tighten or loosen nuts and bolts or fitted with drill bits are well known. However, there is a problem where the same gun is used with a plurality of sizes of bolts. When the gun has sufficient rotary power to tighten large bolts adequately, for example three-quarter inch bolts, then the same gun has the power to twist the head off three-eighths inch bolts under full power. As a result the heads of small bolts are twisted off and great problems are often encountered in removing the broken shaft from the bolt hole, rethreading the bolt hole and reinserting another bolt. It is not practical to have one impact tool for every size of bolt.

In trying to solve the problem where only one gun will be available to the workman one must consider the parameters. In one instance the tool is operating on a source input of about twenty-four to about twenty-eight volts DC, thirty amperes DC, the gun having a one-half inch square drive and a minimum developed torque of over about two hundred seventy-five foot pounds and preferably three hundred foot pounds.

The first attempt to solve this head shearing problem was to try to control the current in the electrical circuit by use of resistors. Unfortunately, the results were inconsistent and no satisfactory result could be achieved. In particular the impact tool for tightening the bolts was operating on Grade 5 bolts which were being tightened into a metallic bolt hole. The available gun used a hexagonal socket to fit over the head of the bolt and it consistently twisted off the heads of five-sixteenth and three-eighths inch bolts when full power was applied.

The gun available on the market is designed for use in the field by public utilities (telephone linemen, etc.) includes a plastic brush holder with one-quarter X one-quarter brushes set at about 22° angle from neutral for electrical "lead" in the forward direction. Unfortunately, with the heavy field use of the gun of this application the brush holder vibrates at a different frequency than the electrical rotor and the body of the gun with the result that the brushes chatter, thereby causing arcing, excess heat and excess brush wear. Also, because of the "lead", commutation is poor in the reverse direction.

Where the gun is used by electrical or telephone workers in a storm the concern is that the worker will be grounded when he is handling a live wire. As a consequence the desire is to use well insulated gloves and boots. If the worker is airborne in the bucket of a cherry picker it is critical that the bucket be insulated. Battery powered tools are used where possible to prevent an electrical line connected to tools from being the path to ground.

SUMMARY OF THE INVENTION

As a result of the experiments in attempting to limit the torque appropriately, a theory was formed that the maximum radial dimension of the head of the bolt was, in fact, a lever arm receiving an impact from the rotary impact tool. That is, the impact power of the tool was being applied at the maximum radius of the head measured from the axis of the bolt shaft to the tips of the corners of the bolt head. As a result of this theory it was decided that one might be able to limit or control the power transmitted between the impact tool and the bolt head by controlling the radius of the driving force on the bolt head.

One mechanism for doing this is to modify the connection between the drive lug of the impact tool and the head of the bolt. A socket is provided for connection to the drive lug and is further provided with means therein which will transmit only a limited torque to the bolt head. A series of detents and ball bearings, or the like, may be suitably located in the socket and configured to "slip" when a specific torque is achieved. This causes the part of the connecting socket mounted on the power lug to rotate but the limiting detent does not allow the socket immediately in engagement with the bolt head to rotate after a certain maximum torque is achieved.

In the course of experiments and based upon the aforementioned theory of the maximum radius for impact transmission, another technique has been discovered. Where the bolt size is three-eighths inches or smaller, if a hexagonal slot is formed in the head of the bolt to receive an Allen wrench-type insertion then torque limiting ability is achieved by limiting the size of the Allen wrench. Specifically using Grade 5 bolts, where the bolt size is five-sixteenths inch, a standard one-quarter inch Allen wrench drive will not shear the head off the bolt when the maximum power of the impact wrench is applied; where the bolt size is three-eighths inches and the Allen wrench is five-sixteenths inches and full power is applied by the impact wrench the head will not be sheared from the shaft. In discussing "full power" throughout this application it is intended to mean an input voltage of about twenty-four to about twenty-eight volts DC, about thirty amperes DC minimum while impacting at input voltage of about twenty-eight volts (at the outlet of the power source), using a cable about forty feet in length, a reversible electrical impact wrench having a one-half inch square drive, a minimum of about 1750 RPM at the indicated input, about 1750 impacts per minute at the indicated input and a power generation of about 275 foot pounds minimum in three seconds.

To solve the chattering-arcing of the electric brushes, the periphery of the brush holder is expanded radially and longitudinally. The radial expansion tends to make the holder vibrate with the gun body because of greater mechanical contact. The holder is now of rigid aluminum alloy and the metal dissipates heat more quickly. Longitudinal openings through the aluminum holder assist in the heat dissipation.

The electrical angle of the brushes is shifted to neutral in relation to field windings of the motor to provide substantially equal power drive in both angular directions. The brushes are of increased size and the holding spring is of greater strength to minimize chattering.

Drilling holes through telephone poles on a dark and rainy night poses some of the same problems of needing equal power to withdraw a drill bit. The need for minimizing arcing, etc. is a common problem solved in the same way. A battery may be attached directly to the power tool or the battery may be cable connected with a battery sitting in the bucket of a cherry picker with the worker.

Objects of the invention not understood from the above will be clear from a review of the drawings and the detailed description of the preferred embodiments which follow.

DESCRIPTION OF THE PREFERRED EMBODIMENTS

Figure 1:
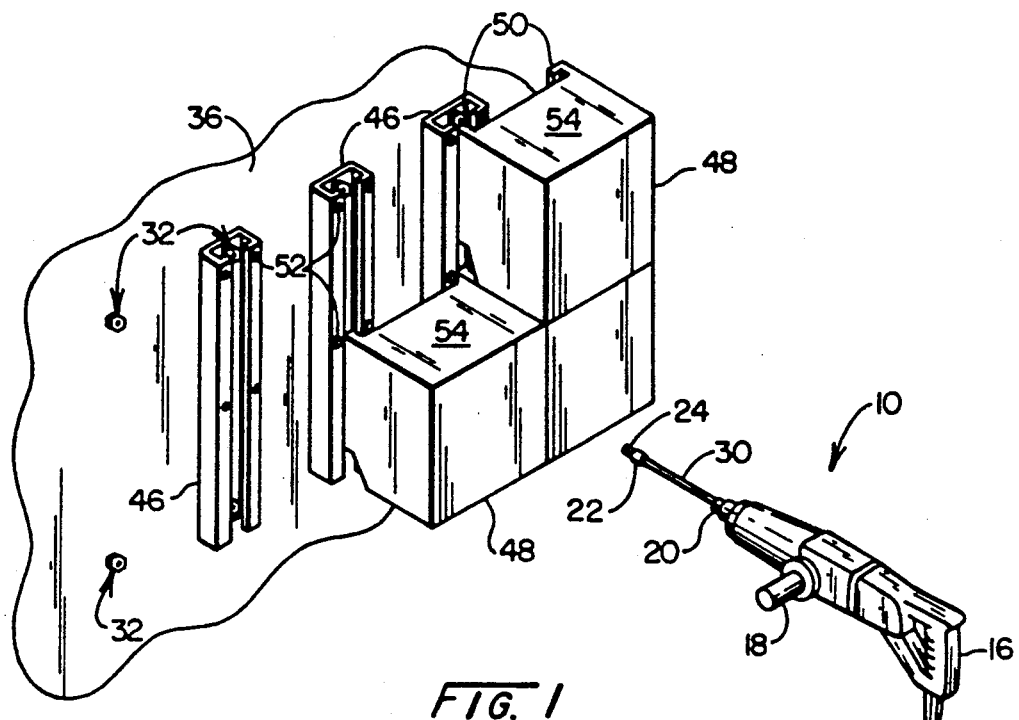
FIG. 1 is a fragmentary perspective view of an environment where this invention would be used.

FIG. 1 shows a rotatable impact tool or gun 10 connected by a cable 12 to a power source 14. For purposes of this invention the power source may be a battery or a generator producing an output voltage of from about twenty-four to about twenty-eight volts DC with a current of about thirty amperes DC minimum with the twenty-eight volt output.

The gun 10 has suitable handles 16 and 18 for manually supporting the gun and a trigger actuator (not shown) mounted in the D-shaped handle 16. On the power drive end of the gun is a square one-half inch drive lug 20 and attached thereto is a tool 22 with a socket on one end and a hexagonal prong 24 on the other end.

Guns commercially available use three-eighths inch drive but that will not be adequate for the power required to tighten and loosen bolts of larger sizes. The increased size of the drive lug is a part of the problem indicated above, namely, twisting the heads off smaller bolts during tightening.

Figure 4:
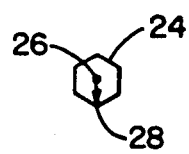
FIG. 4 is an end view of the tool of FIG. 2 useful in tightening the bolt according to this invention.

The preferred shape of the prong is hexagonal as best seen in FIG. 4. In the preferred embodiment an Allen wrench-type prong is used but the exact polygonal shape is not critical, it could have from three to eight sides. What is critical is the radial or diagonal dimension from the wrench axis 26 to the maximum outer dimension at the corner 28 of the polygonal shape, as will be explained in more detail subsequently.

Looking again to FIG. 1, the tool 22 is shown connected to the drive lug 20 by an extension 30. This extension is purely optional and may or may not be used in the inventive concept, depending upon the circumstances.

Figure 2:
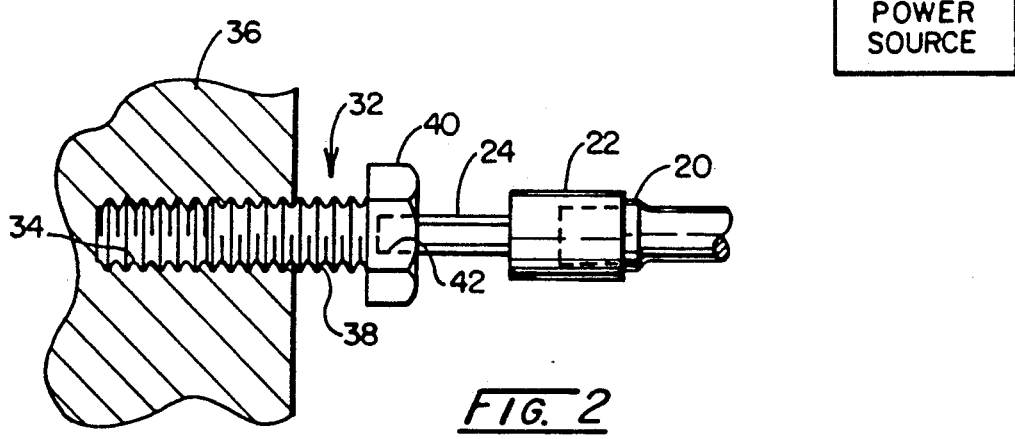
FIG. 2 is a fragmentary sectional view showing the connection between the head of a bolt to be tightened and the tool fitting into a slot in the bolt head.
Figure 3:
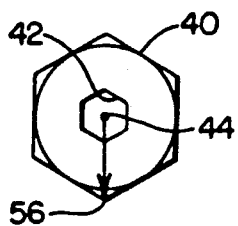
FIG. 3 is a top plan view of the head of the bolt of FIG. 2.

Gun 10 is poised in operative position to remove a bolt 32 from a threaded bolt hole 34 (best seen in FIG. 2) in a metallic substrate 36. The bolt itself includes a threaded shaft 38 having a hexagonal head 40 on one end. As best seen in FIG. 3 the head 40 includes a hexagonal slot or depression 42 oriented coaxially with the axis 44 of the shaft 38. Slot 42 is designed to receive the Allen wrench prong 24 in closely fitting relationship to provide the drive mechanism for tightening the bolt 32 into the bolt hole 34.

Looking again to FIG. 1, two bolts 32 are aligned vertically and may be removed for purposes of fitting a channel 46 into place adjacent the substrate 36 and then the bolts 32 may be reinserted and tightened to hold the channel in place. With the channels rigidly attached to the substrate, blocks of material 48 may be mounted thereon. Each block 48 has a pair of L-shaped flanges 50 formed on one side which may slip into the C-shaped channels 46 and be supported in position by some shelf, lug or the like which limits downward passage (not shown)

Note bolt holes 52 in the face of flanges of channels 46. These holes are designed to receive cap screws which would fit above the upper surface 54 of each side of each block to prevent the vertical movement of block 48 after it is seated in place on channels 46.

Looking again to FIGS. 3 and 4, it is believed that the reason an impact wrench operating under the parameters indicated above is capable of shearing the head of a Grade 5 bolt having a shaft diameter smaller than three-eighths inches when the full power of the gun 10 is applied is that the power is applied through a lever arm of a length from 44 to 56 as illustrated in FIG. 3. This occurs when a conventional hexagonal socket is mounted about the periphery of the bolt head 40. It is believed that the force is thus applied at the maximum radial dimension from the axis 44 of the shaft to the outermost corner of head 40. Mechanical shearing is prevented by using an Allen head-type wrench 24 to fit into the slot 42 because the maximum radius for impact is much smaller, from 26 to 28 as illustrated in FIG. 4. Compare the two distances illustrated in FIGS. 3 and 4, for illustration purposes only consider the Figures to be drawn to scale.

It has been discovered that where one has a bolt size of five-sixteenths inches, a standard Allen wrench drive of one-quarter inch used on gun 10 will not shear the bolt head from the shaft. Neither will a standard Allen drive of five-sixteenths inches shear a bolt shaft of three-eighths inches under the same circumstances. In some instances it is necessary to go to Grade 8 bolts to be absolutely sure that shearing does not take place.

The discussion has been of the radial dimensions of the largest radial dimension on the bolt head where the impact is applied. In discussing the polygonal drive dimensions, reference has been made to "standard Allen wrench" dimensions. Standard Allen wrenches are sized by the diagonal measurement through the wrench axis to opposed flats, not the tips of the corners. A calculation of the dimension through the wrench axis from one corner to the opposite corner will reveal that the corner to corner dimension for a standard one-quarter inch Allen wrench will be less than about five-sixteenths inches and for a standard five-sixteenths inches Allen wrench it will be less than about three-eighths inches. These facts lead to the conclusion, based solely upon actual tests in the field and with a torque wrench operating under the parameters set out above, that the torque wrench will not shear the head from the bolt if the maximum radial dimension to receive the impact is not substantially greater than the radial dimension of the bolt shaft.

Figures 5, 6:
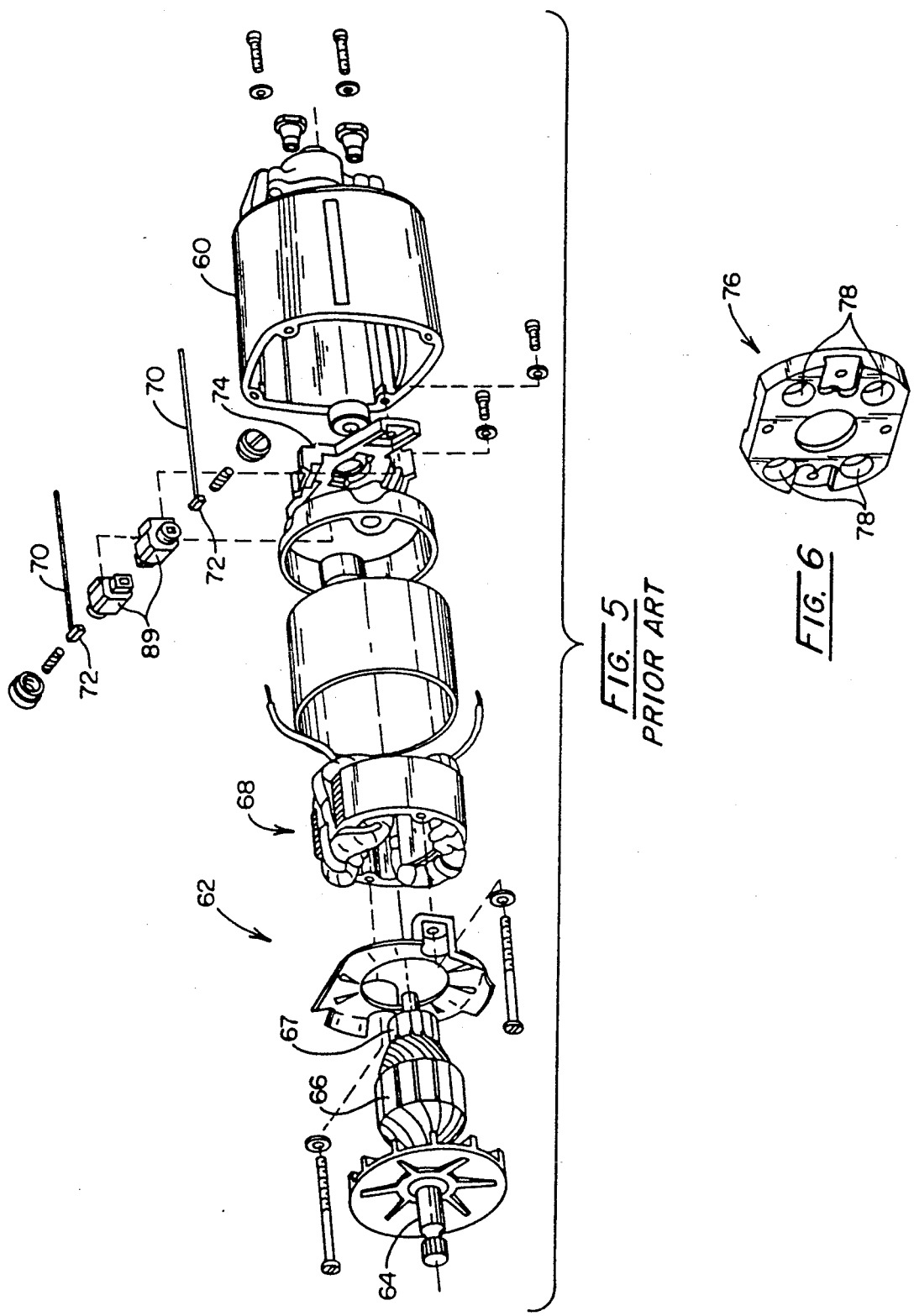
FIG. 5 is an exploded view of the internal structure of a gun according to the prior art.
FIG. 6 is a perspective view of the new improved brush holder of this invention.

Looking now to FIG. 5, the internal structure and functional orientation of the prior art impact gun is illustrated. It includes a hollow body or housing 60 having an electrical motor 62. The motor is mounted to drive a shaft 64 which is mechanically connected to drive lug 20. The motor includes a rotor 66 which will fit inside a stater 68.

Electrical shunts 70 are connected by conventional means to oppositely disposed brushes 72. Brushes 72 are intended to engage the commutator bars 67 of the rotor 66 to drive the electrical motor.

The brushes are mounted in conventional fashion in a holder 74. The holder 74 illustrated in FIG. 5 is plastic and relatively thin in structure and during experiments it has been found to be less than adequate. The problem is that it tends to vibrate with a different frequency than the body 60 and the other metallic parts, and as a consequence, there is chatter between the brushes 72 and the commutator 67 with the obvious resulting arcing. Additionally, plastic is a relatively low conductor of heat and when the gun is in use it generated considerable heat because it is drawing a large direct current.

To improve the heat dissipation and minimize the difference in vibration frequency, a thicker, stronger aluminum alloy holder 76 as illustrated in FIG. 6 was incorporated. It allows a more rigid mechanical attachment to the body 60, aluminum conducts heat more readily than plastic and it includes longitudinally extending apertures 78 to assist in the dissipation of heat.

Figure 7:
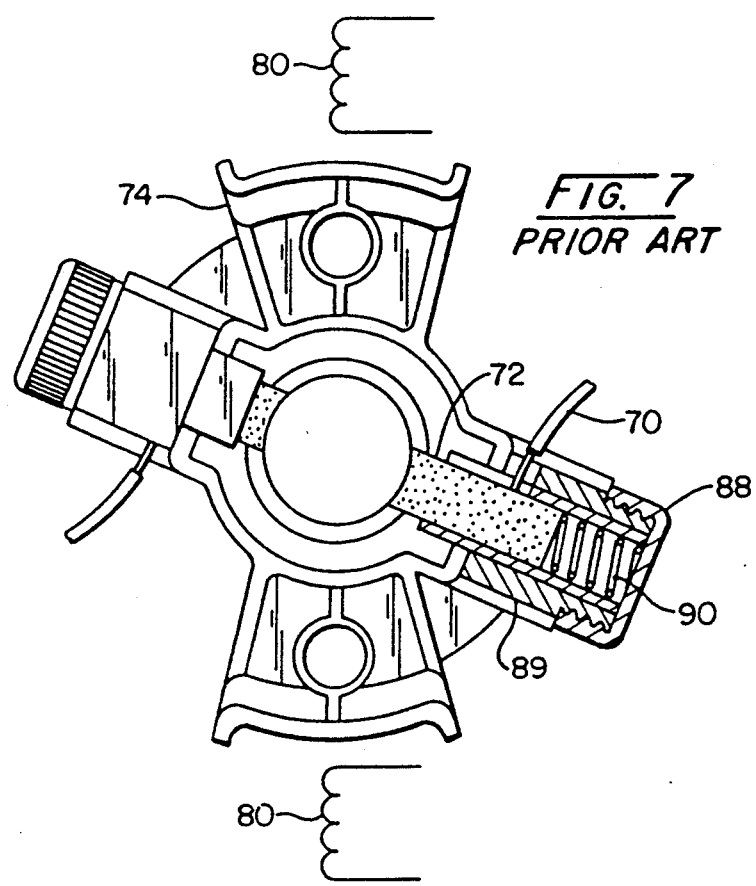
FIG. 7 is a front elevational view of the brush holder with the brushes in operable position according to the prior art.
Figure 8:
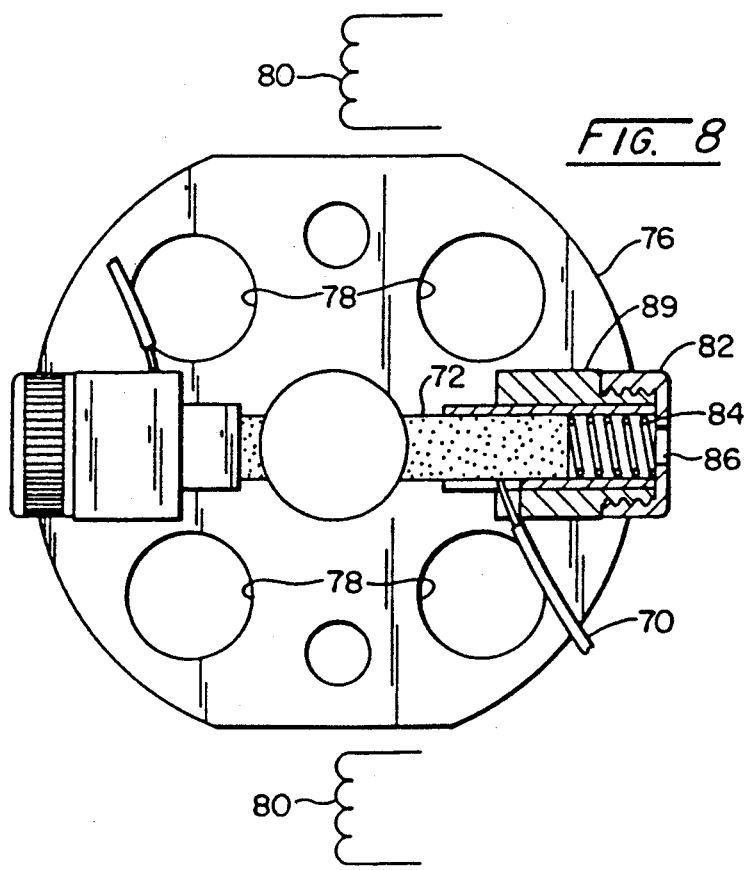
FIG. 8 is a front elevational view of the new improved brush holder with the brushes in operable position.

FIGS. 7 and 8 illustrate some additional improvements in the internal structure of the gun which have made it operable in the environment described.

In FIG. 7, it will be observed that the brushes are at 22° angle from neutral for electrical lead in the forward direction, note the field windings 80. This is good for tightening but not so good for loosening. It provides a good commutation in the forward direction but relatively bad commutation in the reverse direction. Since the gun of this invention is intended for use for both tightening and loosening the bolts 32, the loosening may often be more important than the tightening, as a consequence, in the preferred embodiment as illustrated in FIG. 8 the brushes are at neutral position in relation to the field windings to provide a better loosening power drive.

The inventors speak with some authority as to the prior art because, insofar as they know, their employed is the only supplier of the prior art gun which is used primarily by utility companies where conventional electrical power is not available. The guns of the prior art are powered by portable batteries.

One additional improvement and modification from the prior art is in the cap 82 which is threaded into place to bias spring 84 against the rear of brush 72. The cap 82 has an opening 86 along its central axis to further dissipate heat. It will be observed in FIG. 7 that the cap 88 does not have a heat dissipating opening therein. In both cases the caps 82 and 88 are of phenolic resin and threaded to the phenolic resin brush holder 89. In the improved embodiment of FIG. 8 a cyanoacrylate adhesive is applied between the threads to prevent unthreading. The preferred adhesive is Loctite No. 405 by Loctite Corporation.

To further minimize chattering between the brushes 72 and the commutator bars 67 of the rotor 66, the spring 84 is stronger, it exerts a radially inward force in tightened position of about ten ounces as compared to the spring 90 of the prior art which applies a force of less than about nine ounces. This preferred structure results in a force on the brush face at bars 67 of about 0.05 psi.

One additional feature which is added by this improved structure is increasing the size of the brushes from one-quarter by one-quarter to one-quarter by five-sixteenths inches which also increases the contact area between the commutator bars and the brushes, minimizes chatter and reduces the current density in the brushes.

Figure 9:
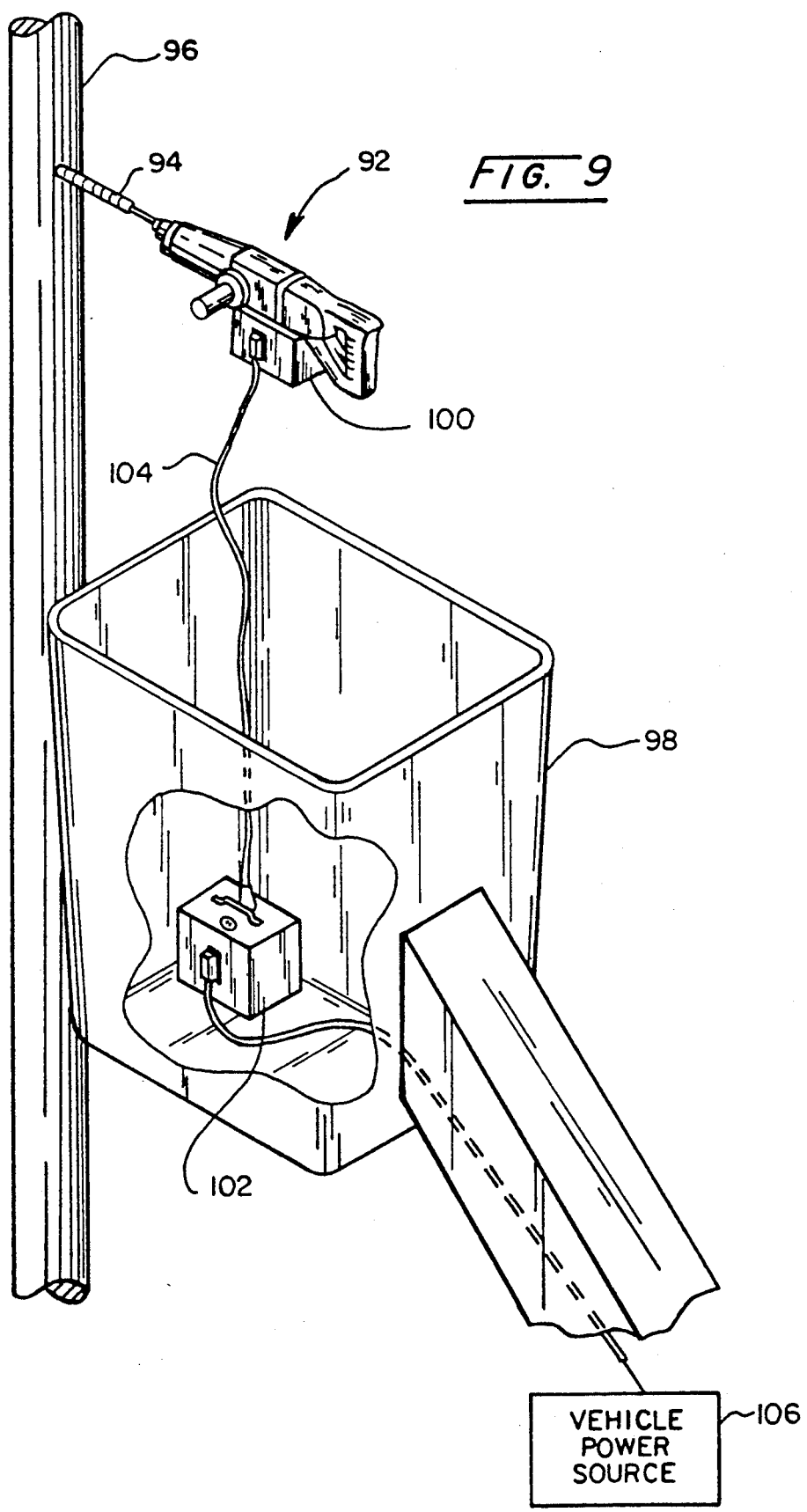
FIG. 9 is a perspective view of a gun above the bucket of a cherry picker and with a drill bit in the gun, a first battery directly connected thereto, a second alternative battery connected by cable, and another cable connected to a vehicle battery.

Looking to FIG. 9, a different shape is illustrated for the gun 92 but the internal structure remains the same. The gun will drive bit 94 to drill a hole in wooden pole 96 while the workman stands in the bucket 98 of a cherry picker. A battery 100 is directly mounted on the gun. Additionally or alternatively a battery pack 102 may be connected to the gun by a short cable 104. Doubling the battery power source by both batteries 100 and 102 allows the worker to drill for longer periods and/or with greater power. As a further enhancement for the power supply, the battery pack 102 may be connected to a vehicle battery 106 if desired. The gun may be powered by any of batteries 100, 102 or 106, alone or in combination as needed under field conditions. Ordinarily only one of the three batteries will be necessary for a given project.

Having thus described the invention in its preferred embodiment it will be clear that variations can be made in the apparatus and process without departing from the spirit of the invention. For example, some mechanical attachment between the drive lug and the bolt head which does not include an Allen wrench type engagement could be used where the effective torque transmission to the bolt head would be at a radial dimension not substantially greater than the bolt shaft radius. It is not intended that the invention be limited by the words used to describe the invention nor the drawings showing the same. Rather it is intended that the invention be limited only by the scope of the appended claims.

We claim:

1. Apparatus in combination including an electrical, torque-transmitting, rotary, impact tool connected to a battery, said tool including a drive lug on one end and means for rotating said lug at a specific speed and with a torque of up to about 300 ft. lbs., said tool including a hollow body encompassing an electrical drive motor, said motor being connected to rotate said lug, said motor including a field winding, brushes and a rotor, said rotor having commutator bars configured to be engaged by said brushes to drive the motor when said brushes are connected to said battery, said brushes being mounted in a neutral position in relation to said field winding, the brushes are secured to a rigid aluminum alloy holder which circumscribes the rotor, the holder and hollow body vibrate when the motor drives the lug, said holder and body in combination being configured vibrate at about the same frequency when the motor is rotating said lug.

2. The apparatus of claim 1 wherein the aluminum holder includes means forming a plurality of heat dissipating apertures extending generally parallel to said rotor.

3. The apparatus of claim 2 wherein the electrical motor is connected to an electrical source input of a minimum of about thirty amperes, about twenty-four to about twenty-eight volts DC and develops a minimum of about two hundred seventy-five foot pounds of torque.

4. The apparatus of claim 3 wherein the brushes are mounted in a phenolic resin holder secured to said aluminum holder.

5. The apparatus of claim 4 wherein said brushes are biased toward said rotor by a radially inward force of about ten ounces.

6. The apparatus of claim 5 wherein said biasing means comprises a spring, a threaded phenolic resin cap is threaded to the resin brush holder to hold said spring in compressed condition to apply said bias against the brushes.

7. The apparatus of claim 6 including a cyanoacrylate adhesive bonding the threaded cap to said resin brush holder.

8. The apparatus of claim 7 wherein the battery is mounted on said gun.

9. The apparatus of claim 8 wherein the battery connected to the gun is in turn electrically connected to a battery pack to enhance the power and duration of the driving force.

10. The apparatus of claim 9 wherein the battery pack is electrically connected to a vehicle battery.

11. The apparatus of claim 7 wherein the battery comprises a battery pack, said pack being electrically connected to said gun by a short cable.

12. The apparatus of claim 11 wherein the battery pack is electrically connected to a vehicle battery.

* * * * *